United States Patent
Retsch

(10) Patent No.: US 8,733,200 B2
(45) Date of Patent: May 27, 2014

(54) SHIFTING DEVICE OF A MOTOR VEHICLE MANUAL TRANSMISSION

(75) Inventor: Matthias Retsch, Brandenburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 256 days.

(21) Appl. No.: 13/382,624

(22) PCT Filed: Jul. 7, 2010

(86) PCT No.: PCT/EP2010/059742
§ 371 (c)(1),
(2), (4) Date: Jan. 6, 2012

(87) PCT Pub. No.: WO2011/003946
PCT Pub. Date: Jan. 13, 2011

(65) Prior Publication Data
US 2012/0096972 A1  Apr. 26, 2012

(30) Foreign Application Priority Data
Jul. 8, 2009 (DE) .......................... 10 2009 027 533

(51) Int. Cl.
*F16H 59/02* (2006.01)

(52) U.S. Cl.
USPC ..................................... 74/473.26; 74/473.36

(58) Field of Classification Search
USPC ................. 74/473.21–473.26, 473.28, 473.3, 74/473.33, 325, 335; 180/330
See application file for complete search history.

(56) References Cited

U.S. PATENT DOCUMENTS

| 3,533,301 | A | * | 10/1970 | Hausinger | 74/473.21 |
| 3,690,193 | A | * | 9/1972 | Naumann | 74/473.24 |
| 3,933,057 | A | * | 1/1976 | Tsuzuki et al. | 74/473.22 |
| 4,324,150 | A | * | 4/1982 | Kawamoto | 74/473.22 |
| 4,373,403 | A | * | 2/1983 | Malott et al. | 74/337.5 |
| 4,638,678 | A | * | 1/1987 | Gorman et al. | 74/473.22 |
| 4,938,088 | A | * | 7/1990 | Langley et al. | 74/335 |
| 5,036,722 | A | * | 8/1991 | Park | 74/473.22 |
| 5,056,376 | A | * | 10/1991 | Moroto et al. | 74/335 |
| 5,289,734 | A | * | 3/1994 | Parsons | 74/473.21 |
| 5,331,863 | A | * | 7/1994 | Kobayashi et al. | 74/473.21 |
| 6,736,020 | B2 | * | 5/2004 | Koyama et al. | 74/335 |
| 6,892,600 | B2 | * | 5/2005 | Onuma et al. | 74/473.24 |
| 8,061,231 | B2 | * | 11/2011 | Fischer et al. | 74/473.21 |

FOREIGN PATENT DOCUMENTS

| DE | 30 46 885 A1 | 6/1982 |
| DE | 31 41 271 A1 | 5/1983 |
| DE | 39 34 733 A1 | 4/1990 |

(Continued)

*Primary Examiner* — Troy Chambers
*Assistant Examiner* — Valentin Craciun
(74) *Attorney, Agent, or Firm* — Davis & Bujold, PLLC; Michael J. Bujold

(57) ABSTRACT

A shifting device of a transmission comprises a selector interlock which can prevent a gear shift shaft from moving into an outer shift gate. The interlock comprises a locking ring which is axially and rotationally movably supported by the shaft. The ring has a stop surface with a tooth and a locking surface and is held by a spring in a rest position. A stop surface of the shaft abuts the tooth when the shaft is moved toward the outer shift gate, before reaching the second inner shift gate. The locking surface of the ring abuts a housing locking surface when the shaft reaches the next shift gate by further displacement of the shaft. The tooth of the ring engages in a recess when the shaft ring rotates to a gear shift position in the next inner shift gate.

15 Claims, 7 Drawing Sheets

(56) References Cited

FOREIGN PATENT DOCUMENTS

| DE | 197 29 767 | A1 | 3/1998 |
| DE | 199 08 147 | A1 | 8/2000 |
| DE | 100 31 754 | A1 | 1/2001 |
| DE | 102 32 530 | A1 | 1/2004 |
| EP | 0 247 976 | A1 | 12/1987 |
| EP | 2 023 022 | A2 | 2/2009 |
| GB | 2 089 450 | A2 | 6/1982 |

* cited by examiner

SHIFTING DEVICE OF A MOTOR VEHICLE MANUAL TRANSMISSION

This application is a national stage completion of PCT/EP2010/059742 filed Jul. 7, 2010 which claims priority from German Application Serial No. 10 2009 027 533.9 filed Jul. 8, 2009.

FIELD OF THE INVENTION

The invention relates to a shifting device of a motor vehicle manual transmission that comprises at least axis-parallel transmission shafts that can be selectively brought together into drive connection via a plurality of gear sets of different transmission ratios, the shifting device having a gear shift shaft which is disposed in the transmission housing in an axially displaceable manner for transmitting the selection processes, and rotatably about its longitudinal axis for transmitting shifting processes, and having a selector interlock that is operationally form locking for preventing axial displacement of the gear shift shaft into an outer shift gate depending on the operation.

BACKGROUND OF THE INVENTION

Multi-stage manual transmissions for motor vehicles, with the exceptions of automatic transmissions in planetary design and double clutch transmissions, are typically designed as simple countershaft transmissions with two axis-parallel transmission shafts that can be selectively brought into drive connection with each other via a plurality of gear sets of different transmission ratios. The gear sets each comprise at least one fixed gear disposed rotationally fixed on one of the two transmission shafts, and one idler gear rotationally supported on the other transmission shaft. For the forward gears, the respective idler gear is in direct gear engagement with the assigned fixed gear, and can be connected rotationally fixed to the respective transmission shaft by means of an assigned gear coupling. For the reverse gear, the idler gear is in drive connection, via an intermediate gear, to the assigned fixed gear for reversing the direction of rotation. By engaging the respective gear coupling, the idler gear of the respective gear set is connected rotationally fixed to the assigned transmission shaft, and therefore the respective gear is engaged within the transmission. By disengaging the gear coupling, the rotationally fixed connection of the idler gear to the assigned transmission shaft is disengaged, and therefore the respective gear is disengaged within the transmission. The gear couplings are typically designed as lock synchronized or unsynchronized dog clutches that each can be engaged or disengaged via a shift collar disposed in a rotationally fixed and axially displaceable manner on the respective transmission shaft.

For actuating the shift collar, and thus for engaging and disengaging a gear within the transmission, a shift rod is typically disposed axis-parallel to the respective transmission shaft and supported in an axially displaceable manner, and is in form locking engagement with the shift collar via a rigidly fastened shift fork that engages in an outer annular groove of the shift collar. Alternatively, the shift rod can also be connected, via a form locking engagement, to a swivel shift lever, that is arranged between the shift rod and the shift collar, and is mounted so that it can be pivoted about a tangential axis of rotation, and engages with a fork-shaped part into the external annular groove of the shift collar.

To limit the constructive space, the idler gears of two adjacent gear sets are each preferably disposed on the same transmission shaft, and the respective two gear clutches are combined in a shift packet with a common shift collar, so that the engaging and disengaging of the respective two gears occurs via an axial displacement of a single shift rod in the respective opposite direction.

In particular with manually shiftable motor vehicle transmissions, the gear sets of subsequent gears are typically arranged on the transmission shafts in axially adjacent pairs, having the same paired association of fixed gears and idler gears to the transmission shafts, and having a common shift packet, so that in each case two subsequent gears can be engaged and disengaged via a common shift rod. Thus, the assignment of the gears to the shift rods corresponds to the typical H or multiple H shift pattern with a plurality of shift gates and a selector gate of a shifting device operated manually by the driver, connecting the shift gates, via which the driver can carry out the selection of the shift gate and the engagement and disengagement of a gear associated with the selected shift gate.

The assignment of the gears in the transmission to the shift rods in this case corresponds to the assignment of the respective gears to the shift gates in the shifting pattern of the manual shift lever. This makes it possible to have a relatively simple mechanical transfer of the selection and shift movements of the manual shift lever via a linkage or cable device outside the transmission and a gear shift shaft inside the transmission, to the shift rods and the shift packets of the transmission, where the gear shift shaft is in most cases disposed vertically to the transmission shafts supporting the gears, and is mounted axially displaceable and rotatable about its longitudinal axis. Through axial displacement of a gear shift shaft disposed in this manner, an assigned shift finger of the gear shift shaft is brought into engagement with a catch of one of the plurality of shift rods, which corresponds to a selection process, that is, the selection of a shift gate. Through rotation of the gear shift shaft about its longitudinal axis, the respective shift rod is axially displaced through the pivoting movement of the shift finger, which corresponds to a shifting process, that is, the engagement and disengagement of a gear of the respective shift gate.

Thus, selection movement of the manual shift lever, that is, a change of the shift lever position between two shift gates within the selector gate, corresponds inside the transmission to a change of the connection for adjusting the gear shift shaft between two shift rods, and shifting movement of the shift lever, that is, a change of the shift lever position between a shift position of a first gear, a neutral position and a shift position of a second gear within the selected shift gate, corresponds inside the transmission to axial displacement of the shift collar that is coupled to the gear shift shaft via the associated shift rod, between a first shift position in which the clutch of the first associated gear is engaged, a neutral position in which the clutches of both associated gears are disengaged, and a second shift position in which the clutch of the second associated gear is engaged.

Manually shiftable transmissions of motor vehicles up to now have typically comprised five or six forward gears, and consequently a relatively small number of shift gates. Known shift patterns of such transmission are shown in FIGS. 5a and 5b. The known shift pattern 20 of a five-speed transmission, according to FIG. 5a, comprises only three shift gates 21, 22, 23, and a selector gate 24 connecting the shift gates. The first gear G1 and the second gear G2 are associated with a first outer shift gate 21. The third gear G3 and the fourth gear G4 are associated with a center second shift gate 22, in which the manual shift lever 25 is held by spring elements within the selector gate 24, and into which the manual shift lever 25 is automatically returned when it is released within the selector gate 24. The fifth gear G5 and the reverse gear R are associated with a third outer shift gate 23.

In order to prevent inadvertent engagement of the reverse gear R, with a shifting device with such a shift pattern 20, typically there is shift interlock that can be designed as a push lock, a push-down lock or as a pull ring lock.

The known shifting pattern 30 of a six-speed transmission, according to FIG. 5b, comprises four shift gates 31, 32, 33, 34 and the selector gate 35 connecting the shift gates. In this shifting pattern 30, in addition to the fifth gear G5, the sixth gear G6 is also assigned to the outer third shift gate 33. The fourth shift gate 34 is disposed outside of the outer first shift gate 31, and allocated only to the reverse gear R.

Accidental engagement of the reverse gear R during a shift procedure with a pattern such as shift pattern 30 can be prevented by a shift interlock of the type described above, and also by a selector interlock, by means of which, starting from a neutral position of the first shift gate 31, selecting the fourth shift gate 34 is made difficult due to an increased selection force, or is prevented by a releasable form fitting lock. Such shift or selection interlocks typically operate together with the manual shift lever 36 in the shift device external to the transmission, and in most cases are vehicle-specific, and limited to use with manual transmissions.

Due to the demands for increasingly lower motor vehicle fuel consumption, an increased number of gears is necessary for the manual transmission because a reduction in the transmission ratio steps between the gears enables nearly constant operation of the respective combustion engine in a rotational speed range with a specific low fuel consumption. This inevitably leads to a higher number of shift gates, which particularly in the case of manual transmissions can lead to an incorrect selection and a shift into an unsuitable gear due to relatively small spacing of the shift gates in the shift pattern of the manual shift lever 47.

To highlight this problem, FIG. 5c shows the shift pattern 40 of an eight-speed transmission having five shift gates 41, 42, 43, 44, 45 and one selector gate 46 connecting the shift gates. This shift pattern 40 that is known in a similar form, expanded by a creep gear, from the shifting device of the commercial vehicle transmission described in DE 39 34 733 A1, in comparison to the shift pattern 30 of the six-speed transmission according to FIG. 5b, comprises another shift gate 44 that is disposed outside of the third shift gate 43, and comprises the seventh gear G7 and the eighth gear G8.

In the case of a manual transmission or a shifting device having such a shift pattern, there is the danger that with an upshift from a gear G3 or G4 of the second shift gate 42 into a gear G5 or G6 of the third shift gate 43, the gate for the gears G5, G6 is unintentionally bypassed and as a consequence a gear G7, G8 of the fourth shift gate 44 is erroneously engaged. This shifting error leads to an increased loss of tractive power and requires an immediate corrective shift into a lower gear G5, G6.

Whereas the delimitation of the reverse gear R, or the shift gate 45 of the reverse gear R, by a shift or selector interlock of the type described above is possible, such a delimitation of the outer shift gate 44 allocated to the forward gears G7, G8 is judged to be unacceptable due to the associated shift delay. Therefore, it appears expedient to equip a shifting device of a multi-stage manual transmission having such a shift pattern with a selector interlock for preventing a selection of the outer shift gate 44 depending on the operation.

A shifting device of a manual transmission having a suitable selector interlock disposed in the transmission for this purpose is described in the document DE 100 31 754 A1. This selector interlock that operates by increasing the actuating force, comprises a spring-loaded ball that is guided perpendicular to the gear shift shaft of the shifting device and is in contact with the surface of the gear shift shaft. Due to an increase in the diameter of the gear shift shaft between an outer shift gate preferably allocated to the reverse gear R and the next inner shift gate, an axial selector movement of gear shift shaft into the outer shift gate results in an increase of the required actuating force, which in the case of an electric motor design of the selector can be recognized by an increased current consumption of an actuator for this regard.

The document, DE 31 41 271 C2, discloses a shifting device of a group transmission having a main transmission and a two-stage range group, that are manually shiftable using a common gear shift shaft that comprises a similar selector interlock of a spring-loaded plunger, which is guided perpendicular to the gear shift shaft and in contact with the surface of the gear shift shaft. The increase of the diameter of the gear shift shaft between a shift gate allocated to the lower gears of the fast speed range and a shift gate allocated to the high gears of the slow speed range, results in an increase of the necessary actuating force for an axial selector movement of the gear shift shaft to the downshift range. Due to the connection of a pressure means, pressure acting, via a pressure piston, on the pressure spring of the plunger, which occurs when exceeding a higher driving speed, the necessary actuating force is increased so that an inadvertent shift into the downshift range is largely excluded.

In contrast, document DE 30 46 885 C2 describes a shifting device of a group transmission having a manually shiftable main transmission and automatically shiftable two-stage range group. The range group is shifted via a double acting shifting cylinder, actuated by pressure means, that is controlled via two directional valves sensing the control contour of a locking body fastened on the gear shift shaft. A locking cylinder aligned perpendicular to the gear shift shaft, that has a locking bolt and can also be controlled by the two directional valves, ensures that the shift gates of the main transmission allocated to the low gears are not selected in the case of a range downshift. In the case of a range downshift, the locking bolt is pressed by the supply of pressure means against the force of a reset spring into a locking position in which axial displacement of the gear shift shaft from the shift gate allocated to the high gears into the shift gate of the main transmission allocated to the low gears is blocked in a form locking manner. After switching the locking cylinder to become pressureless upon reaching the shift gate allocated to the high gears, the pressure medium escapes via a throttle so that the blocking release of the shift gate allocated to the low gears is time delayed.

A shifting device of a manual transmission comprising a similar selector interlock is known from the document DE 102 32 530 A1. The selector interlock comprises a locking cylinder having a locking bolt aligned perpendicular to the gear shift shaft that is constantly subjected to pressure from lubricating oil of the manual transmission. In the case of high lubricating oil pressure, present during travel with the clutch engaged most of the time, the locking bolt presses against the spring force of a reset spring into a locking position in which axial displacement of the gear shift shaft into an outer shift gate allocated to the reverse gear is blocked in a form locking manner. In the case of low lubricating oil pressure, present when the vehicle is stopped and the clutch disengaged, the locking bolt is pressed by the reset spring into its rest position, and with that it is possible to select the outer shift gate and to engage the reverse gear.

The document, DE 199 08 147 A1, describes a shifting device of a manually shiftable transmission having a speed dependent selector interlock. This known selector interlock comprises a centrifugal force measurement mechanism that is preferably disposed at the output shaft which is in constant drive connection with the drive wheels of the motor vehicle. At high speeds, a locking bolt mechanically connected to the centrifugal force measurement mechanism is pushed into a locking position in which axial displacement of the gear shift shaft into one of the outer shift gates allocated to the reverse gear is blocked in a form locking manner. At low speed, in particular when the vehicle is stopped, the locking bolt is pushed back by a reset spring into its rest position, and with this the outer shift gate with the reverse gear is unblocked.

The selector interlocks of the shifting devices described above can, with a relatively small modification effort, also be used for the operation dependent blocking of an outer shift gate allocated to the highest forward gears. Using the selector interlocks known from the documents, DE 100 31 754 A1 and DE 31 41 271 C2, inadvertent selection of an outer shift gate is not reliably prevented due to the mode of operation of these selector interlocks that increase the actuating force. In addition, the known selector interlocks according to the documents DE 31 41 271 C2, DE 30 46 885 C2 and DE 199 08 147 A1 comprise an unfavorably high control effort that is associated with high production costs and high susceptibility to failure. The selector interlocks known from the documents DE 31 41 271 C2, DE 30 46 885 C2 and DE 102 32 530 A1 are furthermore judged to be particularly susceptible to failure due to their function that is based on pressure means.

SUMMARY OF THE INVENTION

Based on this background, the problem addressed by the invention is to propose an operatively form locking selector interlock of a shifting device of a motor vehicle manual transmission of the initially named type which comprises a simple, space-saving design that operates without external energy, and that can be used in a manual transmission as well as in an automated manual transmission.

Accordingly, the invention relates to a shifting device of a motor vehicle manual transmission that comprises at least two axis-parallel transmission shafts that can be selectively brought into drive connection via a plurality of gear sets of different transmission ratios, having a gear shift shaft that is axially displaceable for transmitting the selection processes and is rotatable about its longitudinal axis for transmitting shifting processes, and is disposed in the transmission housing, and having an operationally form locking selector interlock for preventing axial displacement of the gear shift shaft into an outer shift gate depending on the operation.

To solve the problem, the selector interlock with this shifting device comprises a locking ring that is supported coaxially to the gear shift shaft in an axially displaceable and rotatable manner, and that comprises an axially outer locking surface and an axial inner lying stop surface having at least one locking tooth axially projecting by the outer shift gate distance X, that is, by the axial displacement of the gear shift shaft between the outer shift gate and the next inner adjacent shift gate. The locking ring is held in an axial rest position using a linear spring, and in this rest position axial displacement of the gear shift shaft in the direction of the outer shift gate leads to a stop surface of the gear shift shaft contacting the locking tooth, at the latest, upon reaching the second inner shift gate adjacent the nearest inner shift gate, and from this rest position further axial displacement of the gear shift shaft with the axial entrainment of the locking ring and the tensioning of the linear spring, upon reaching the next inner shift gate, leads to the outer lying locking surface of the locking ring contacting a locking surface fixed to the housing. This guarantees that the gear shift shaft cannot be pushed axially beyond the next inner shift gate, whereby the selection of the outer shift gate and the engagement of a gear of the outer shift gate is initially prevented in a form locking manner. In addition, the locking ring is held by means of a torsion spring in a circumferential rest position, in which rotation of the gear shift shaft upon reaching a shifting position of at least a gear of the next inner shift gate, leads to the locking tooth of the locking ring axially engaging in an axial recess in the stop surface of the gear shift shaft due to the reset force of the tensioned linear spring, and with that, to an axial reset of the locking ring by the shift gate distance up to contacting the stop surface of the locking ring at the stop surface of the gear shift shaft. As a result, the outer shift gate is again unblocked so that after the disengagement of the respective gear, that is, after a return rotation of the gear shift shaft into the neutral position, this shift gate can be selected and a gear assigned to this gate can be engaged.

The contour of the locking tooth of the locking ring and the axial recess of the gear shift shaft can in principle be designed with any contour. However, a rectangular contour which attains a large surface contact area of the two components is preferred for avoiding wear or damage to the axial outer edge of the locking tooth and the stop surface of the shifting surface. In terms of a geometric reversal, it is also possible that the arrangement of the locking tooth at the stop surface of the locking ring and the arrangement of the axial recess in the stop surface of the gear shift shaft are exchangeable with the same mode of operation.

Due to the form locking block of further axial displacement of the gear shift shaft, the locking device reliably prevents immediate selection of the outer shift gate from an inner lying shift gate, if previously no gear of next inner shift gate adjacent to the outer shift gate was engaged. However, by axially resetting the locking ring in the shift position of an engaged gear of the next inner shift gate, this blocking effect is released so that afterwards it is possible to select an outer shift gate and to engage one the gears assigned to this gate.

The locking device according to the invention comprises a few, geometrically simply designed components such that it can be constructed simply and in a space-saving manner, and therefore cost-efficiently. In addition, this locking device is particularly functionally reliable due to its form locking manner of operation that does not require any auxiliary energy. Furthermore, the locking device according to the invention can be used for manual transmissions and also for automated manual transmissions due to its arrangement in the transmission.

The locking ring of the locking device can be glidingly supported directly on the gear shift shaft. However, in an embodiment of the gear shift shaft as a hollow shaft supported on a guide shaft fixed to the housing, the locking ring is preferably disposed glidingly supported directly on the guide shaft. A further possibility consists in that the locking ring is disposed glidingly supported on a bearing sleeve mounted coaxial to the gear shift shaft at the axial end side at a housing component.

To enable skipping a gear of the next inner shift gate as required, it is advantageous for the shift positions of both gears of the next inner shift gate to comprise at least one axial recess in the stop surface of the gear shift shaft.

In order to avoid asymmetrical loading, and an associated tilting of the locking ring, the locking ring at its axial inner stop surface expediently comprises at least two diagonally opposed axially projecting locking teeth, and there are correspondingly two diagonally lying axial recesses in the stop surface of the gear shift shaft, in each unblocking shift position of the next inner shift gate.

The linear spring that is operatively connected to the locking ring is preferably designed as a pressure spring disposed between the locking ring and a component fixed to the housing.

In a preferred embodiment, the pressure spring is designed as a helical spring that is disposed coaxial to the gear shift shaft, and the outer windings of which each abut at an annular collar of the locking ring and the component fixed to the housing.

As an alternative, the pressure spring can be designed as a disc spring that is disposed coaxial to the gear shift shaft and the axial outer edges of which each abut at an annular collar of the locking ring and the component fixed to the housing.

In another possible construction, the pressure spring can also be designed as an annular leaf spring that is disposed coaxial to the gear shift shaft and the axial outer edges of which each abut at an annular collar of the locking ring and the component fixed to the housing.

The torsion spring is preferably designed as a leg spring that is disposed coaxial to the gear shift shaft, and in the case of an axial bend, each of the legs thereof is inserted into an axial bore hole of the locking ring and the component fixed to the housing, and in the case of a radial bend, each leg abuts a radial projection of the locking ring and the component fixed to the housing.

However, in order to reduce the number of components, save construction space and simplify the assembly, the linear spring and torsion spring are advantageously combined in a common spring element.

A common spring element is preferably designed as a leg-helical spring that is disposed coaxial to the gear shift shaft, the outer windings of which each abut against an annular collar of the locking ring and the component fixed to the housing, and the legs of which are each inserted into an axial bore hole of the locking ring and the component fixed to the housing in the case of an axial bend, and in the case of a radial bend, each leg abuts against the radial projection of the locking ring and the component fixed to the housing.

The selector interlock according to the invention is provided as an upshift block particularly for use in a multi-stage manual transmission having an outer shift gate that lies at least two shift gates beyond a center shift gate, and that is allocated to the highest forward gear or the two highest forward gears.

However, the selector interlock according to the invention can also be used as a reverse gear block in a multi-stage manual transmission having an outer shift gate that lies at least two shift gates beyond a center shift gate, and that is allocated only to the reverse gear. For this purpose, however, it must be accepted that in the case of startup with the reverse gear, at the beginning of travel for unblocking the outer shift gate, initially a gear of the next inner shift gate, which is typically allocated to the lower forward gear, must be engaged and disengaged again.

BRIEF DESCRIPTION OF THE DRAWINGS

For illustrating the invention, the description is accompanied by a drawing with an example embodiment. It shows.

DETAILED DESCRIPTION OF THE DRAWINGS

Figure 1:
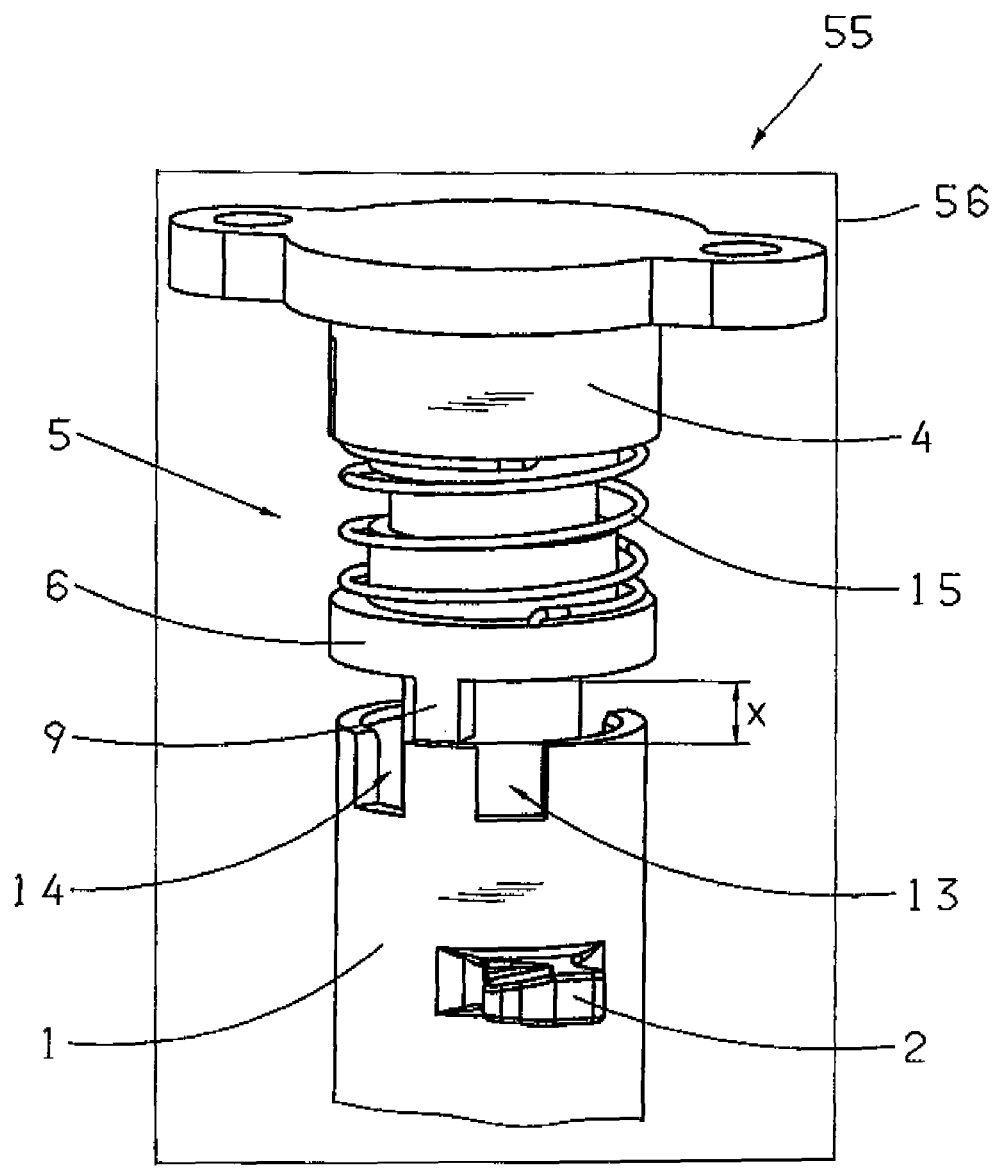
FIG. 1 a perspective section of a shifting device in the transmission having a selector interlock effective at a gear shift shaft and a selector shaft, in the installed state, FIG. 2 the shifting device having the selector interlock according to FIG. 1 in a perspective exploded view, FIGS. 3a-3b essential components of the selector interlock according to FIG. 1 and FIG. 2, FIGS. 4a-4f different operating positions of the selector interlock according to the FIGS. 1 to 3, and FIGS. 5a-5c several shifting patterns of multi-stage manual transmissions.
Figure 2:
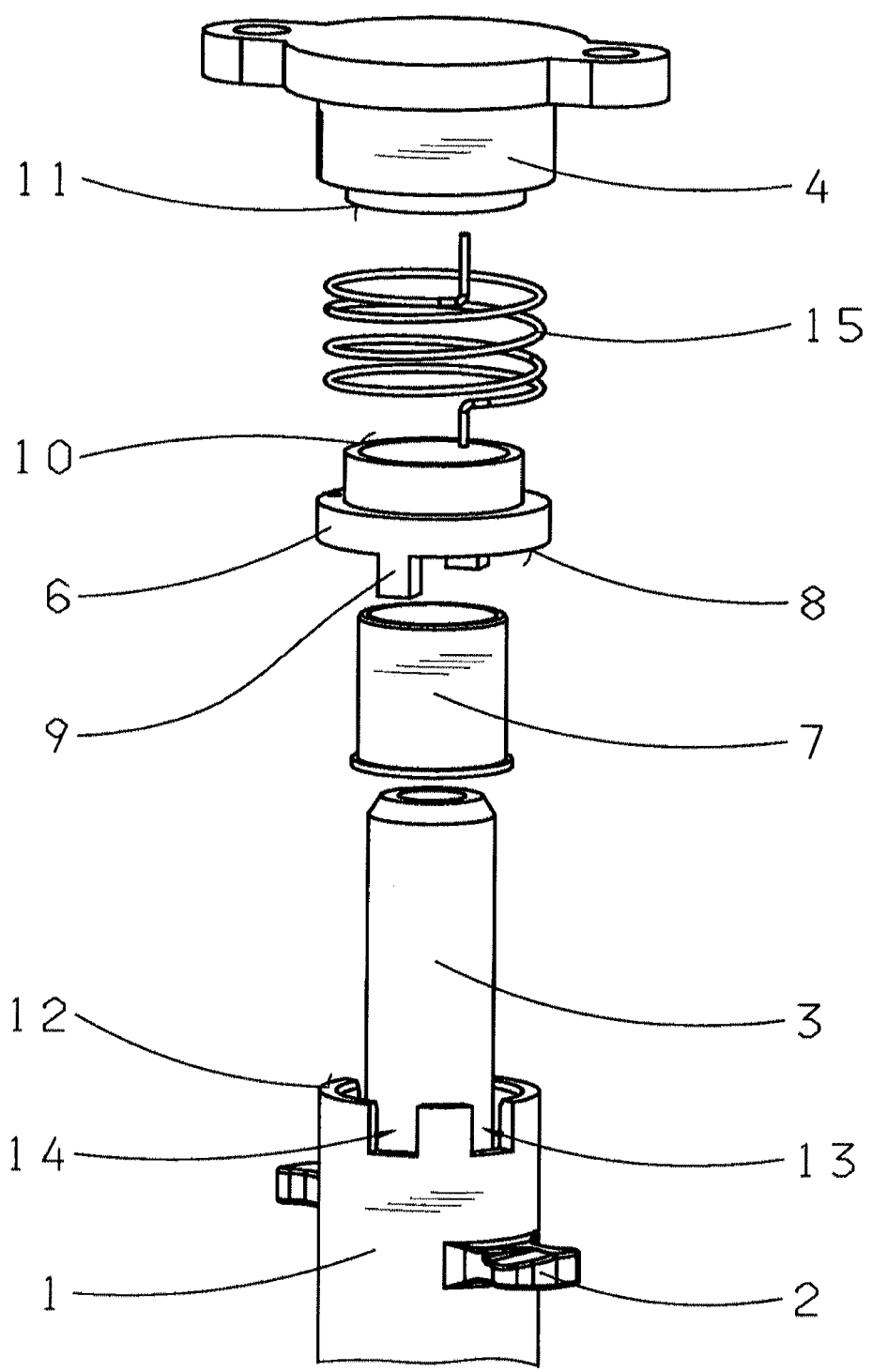

A shifting device of a multi-stage manual transmission 55 according to FIG. 1 and FIG. 2 comprises a gear shift shaft 1 having at least one shift finger 2, and is disposed tangential and perpendicular to transmission shafts of the manual transmission, not shown. In this case, the gear shift shaft 1 is designed as a hollow shaft that is supported axially displaceable on a guide shaft 3 which is fixed to the housing 56, only diagrammatically shown in FIG. 1, and is rotatable about the geometric longitudinal axis thereof. The guide shaft 3 is fastened at the end in a bore of a bearing cover 4 that can be mounted fixed to the housing.

Axial displacement of the gear shift shaft 1 corresponds to a selection process in which the at least one shift finger 2 is released from the form locking coupling to a shift rod, not shown, which is assigned to a particular shift gate, and is brought into form locking engagement with another shift rod, not shown, which is assigned to another shift gate. Rotation of the gear shift shaft 1 corresponds to a shift process in which the respective shift rod is axially displaced due to the pivoting of the shift finger 2, and thereby a gear assigned to the respective shift gate is engaged or disengaged.

A selector interlock 5 that is operational in a form locking manner, comprises, as an essential component, a locking ring 6 that is disposed coaxial to the gear shift shaft 1 and is supported on a bearing sleeve 7, pressed into a bore hole of the bearing cover 4, displaceable in an axially limited manner and rotatable about the geometric longitudinal axis of the gear shift shaft 1.

The locking ring 6 on its side axially facing away from the bearing cover 4 comprises an axially inner stop surface 8 with two diagonally opposite locking teeth 9 projecting axially by the outer shift gate distance X, that is, by the axial displacement of the gear shift shaft 1 between the outer shift gate 44 and the adjacent, next inner shift gate 43. In addition, the locking ring 6 on the side axially facing toward the bearing cover 4 comprises an axial outer locking surface 10.

The bearing cover 4 comprises a locking surface 11 that can be brought into contact with the locking surface 10 of the locking ring 6, thereby limiting the outward axial displacement of the locking ring 6.

The gear shift shaft 1 at the axial end comprises a stop surface 12 having two pairs of diagonally opposite recesses 13, 14 disposed spaced on the periphery. The locking ring 6 is held in an axial and rotational rest position, as shown for example FIG. 1, by means of a leg-coil spring 15 acting as a compression and torsion spring, disposed coaxially, in a form locking manner, fastened on one side to the locking ring 6 and on the other side to the bearing cover 4.

Figure 5A:
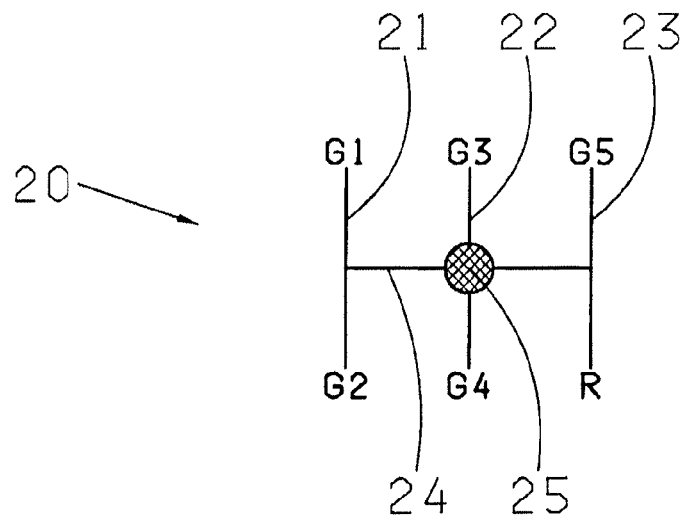
Figure 5B:
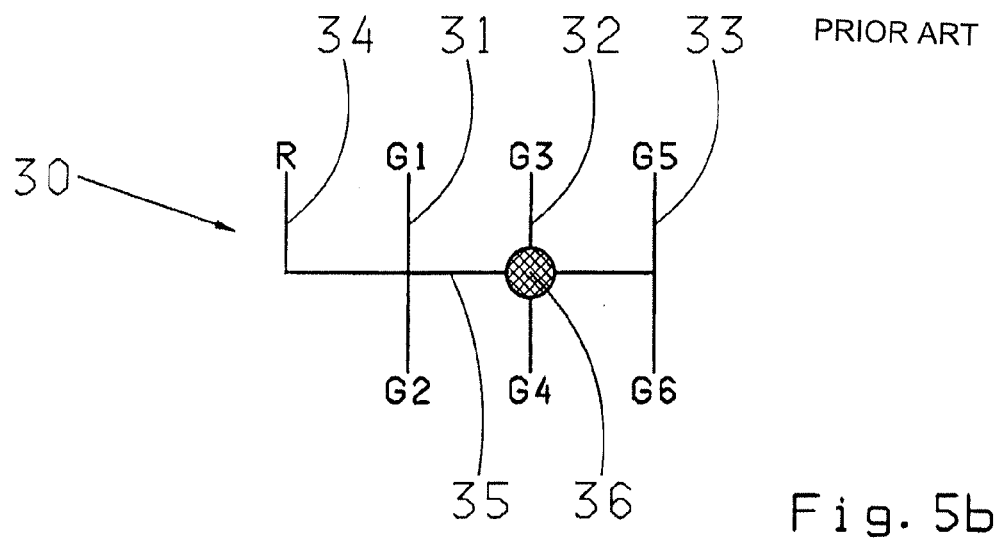
Figure 5C:
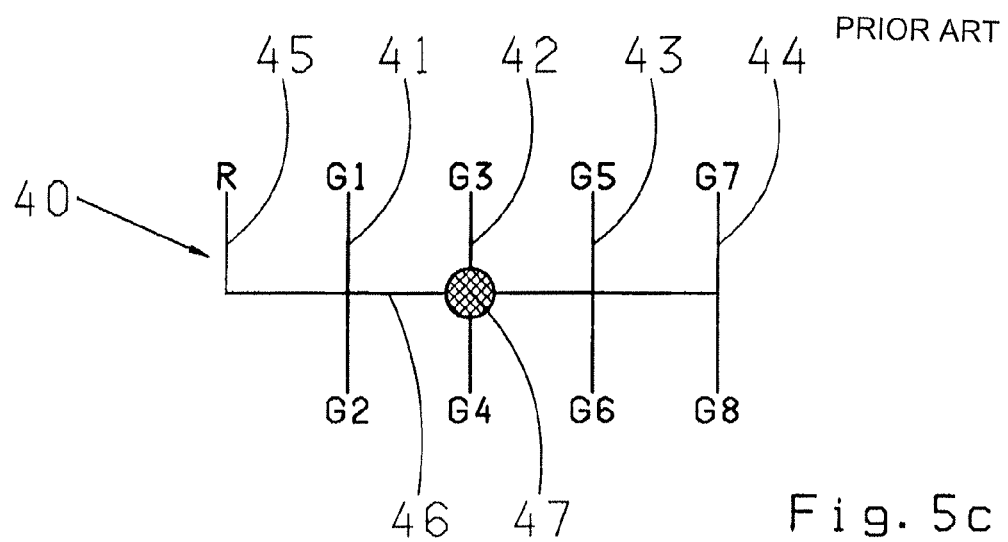

In the following the operation of the selector interlock 5 is explained in detail based on a shift pattern, internal to the transmission, corresponding to the shift pattern 40 according to FIG. 5c, where the outer shift gate 44, allocated to the highest gears G7 and G8, is to be blocked by the selector interlock 5 depending on the operation.

Figure 3A:
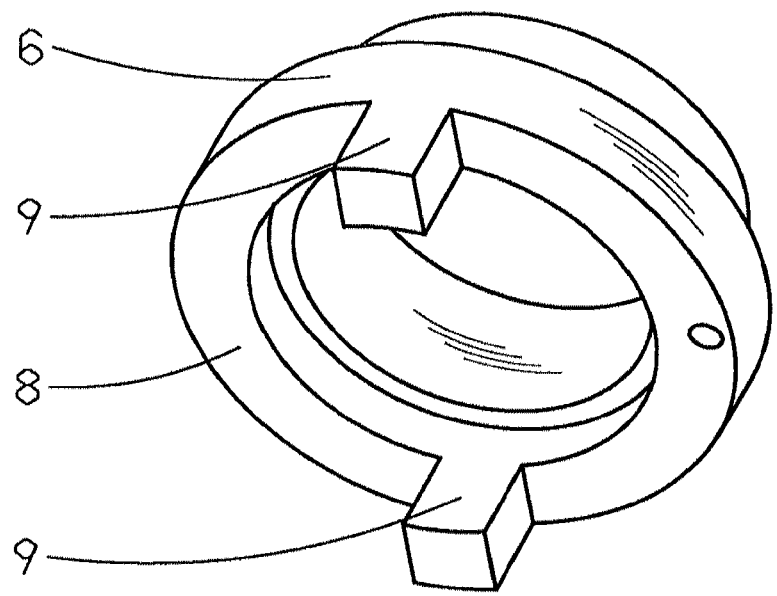
Figure 3B:
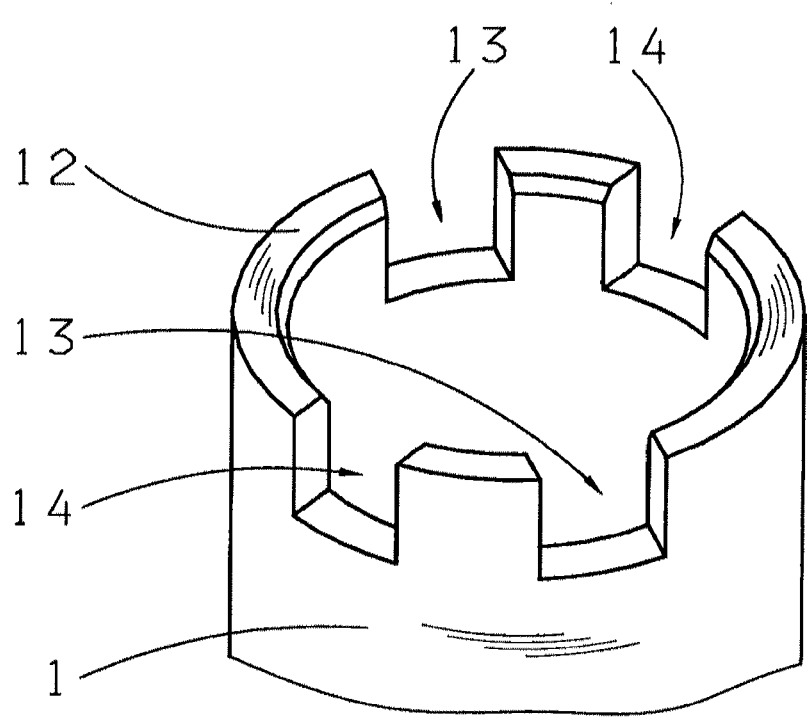

In order to understand the mode of operation, is expedient to take a detailed look at the contours, facing each other axially, of the locking ring 6 and the gear shift shaft 1 which can be seen clearly in FIG. 3a and FIG. 3b. The two locking teeth 9 of the locking ring 6 are aligned on the periphery such that, in the rotational rest position of the locking ring 6, with axial displacement of the gear shift shaft 1 in the direction of the bearing cover 4, or respectively the outer shift gate 44, the teeth strike the stop surface 12 of the gear shift shaft 1. The two pairs of recesses 13, 14 disposed in the stop surface 12 of the gear shift shaft 1 are disposed on the periphery such that with a rotation of the gear shift shaft 1 into a shift position of a gear G5, G6 of the next inner shift gate 43 to the outer shift gate 44, each pair overlaps with the locking teeth 9 of the locking ring 6, whereby the locking teeth 9 of the locking ring 6 can axially engage in the respective recesses 13, 14 of the gear shift shaft 1.

The specific mode of operation of the selector interlock 5 is now illustrated using the FIGS. 4a to 4f, which show the characteristic operating positions of the selector interlock 5. The locking ring 6 is held by the leg coil spring 15 in an axial rest position in which the stop surface 12 of the gear shift shaft 1 abuts the locking teeth 9 of the locking ring 6 in an axial position of the gear shift shaft 1, which corresponds to the second inner shift gate to the outer shift gate 44, that is, the center shift gate 42 allocated to the gears G3 and G4 (see FIG. 4a).

If the gear shift shaft 1 is then shifted in a selection process by axial displacement 16 further in the direction of the bearing cover 4, or the outer shift gate 44, then by axially entraining the locking ring 6 and due to axial tension of the leg coil spring 15, the selector position reaches the inner shift gate 43 next to the outer shift gate 44. In this operating position shown in FIG. 4b, the locking surface 10 of the locking ring 6 abuts the locking surface 11 of the bearing cover 4 so that further axial displacement of the gear shift shaft 1 is prevented in a form locking manner, and thereby preventing the selection of the outer shift gate 44.

Figure 4A:
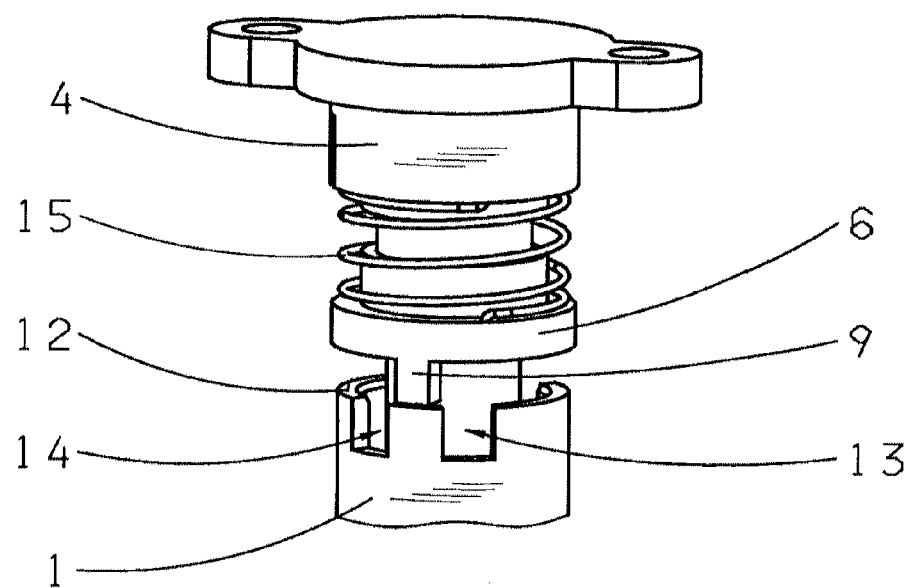
Figure 4B:
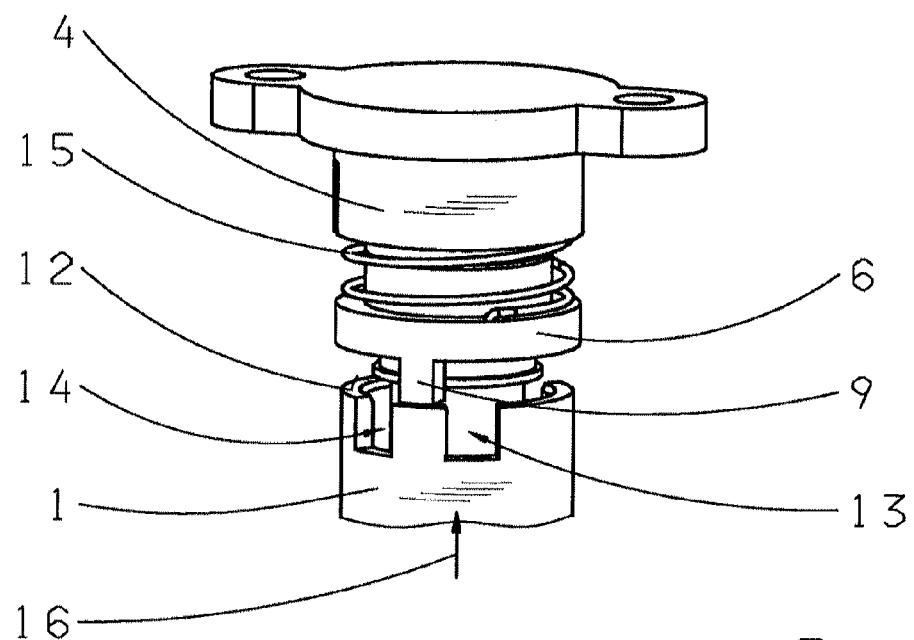
Figure 4C:
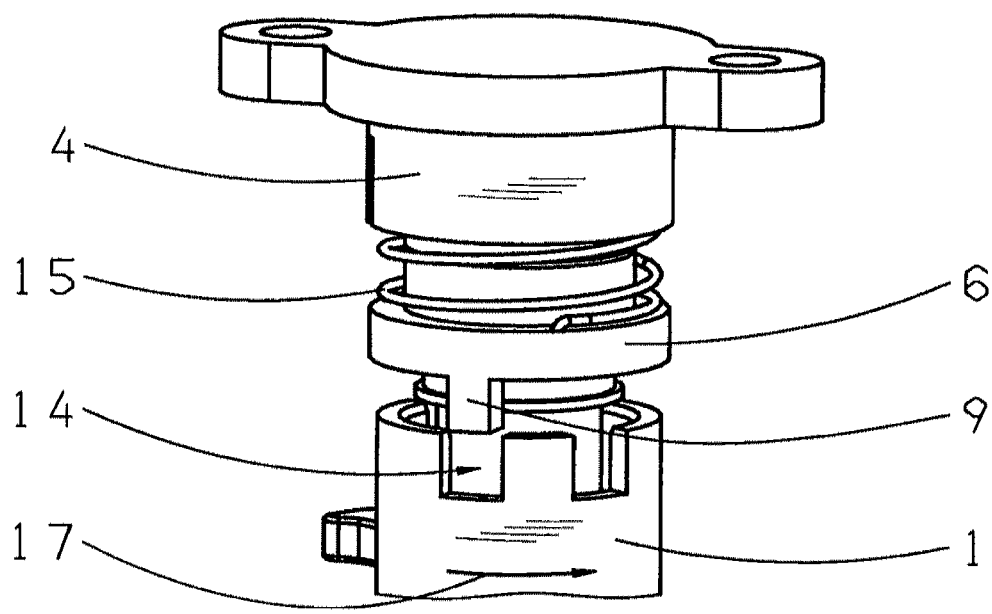
Figure 4D:
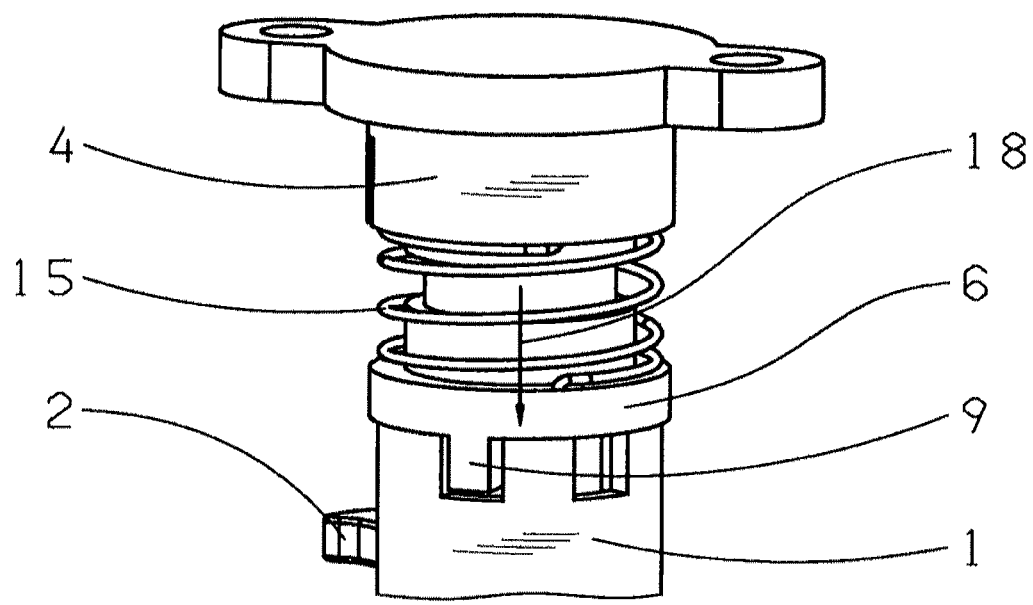
Figure 4E:
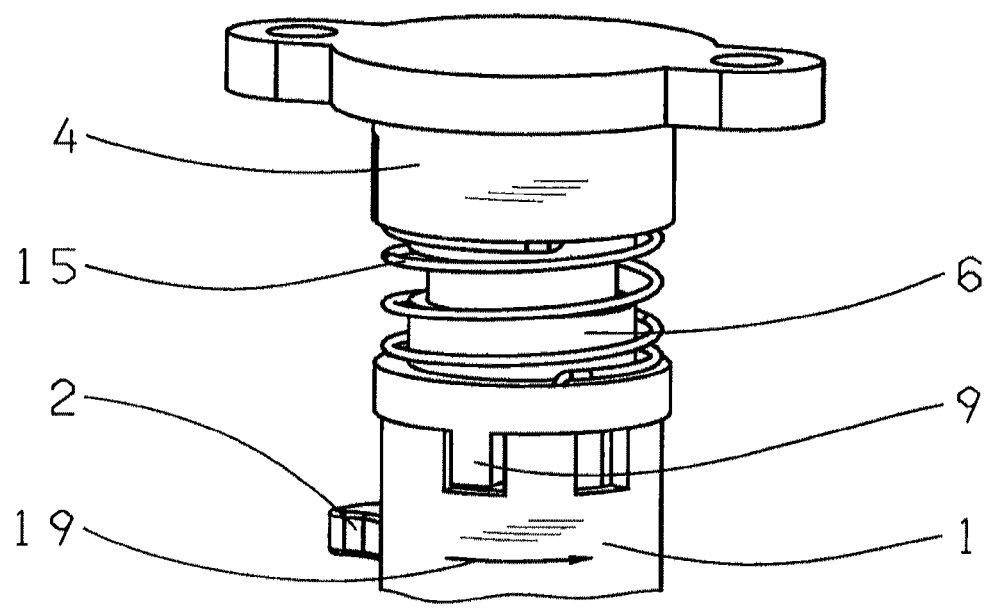
Figure 4F:
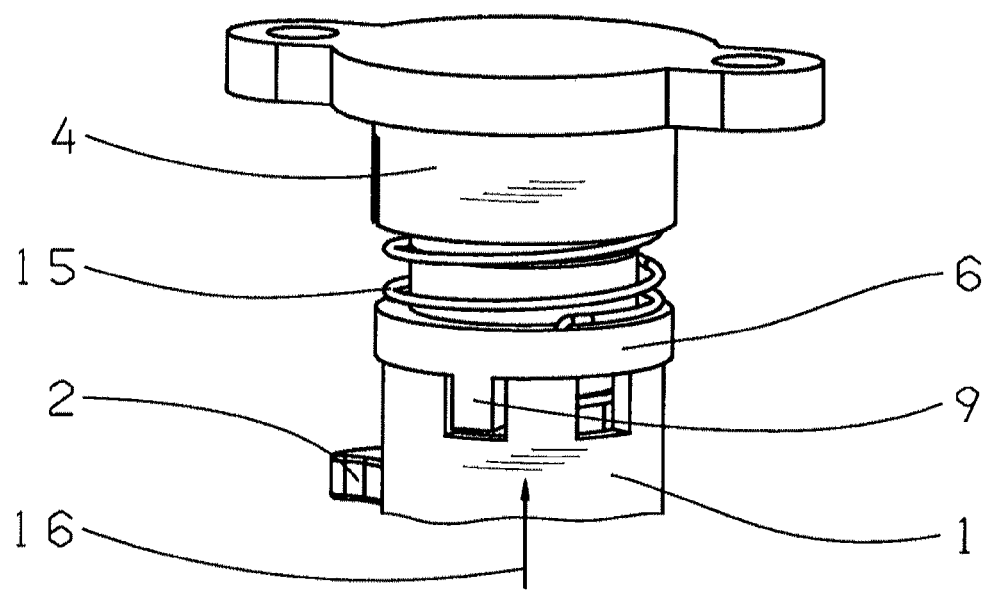

However, if the respective gear is then engaged due to rotation 17 of the gear shift shaft 1 into a shift position of the next inner shift gate 43, here for example into the shift position of the sixth gear G6, then the pair of the recesses 14 of the gear shift shaft 1 assigned to this shift position overlap the locking teeth 9 of the locking ring 6 (see FIG. 4c). In this operating position, the locking ring 6, under the axial return force of the leg coil spring 15, is returned 18 axially inward until the stop surface 8 of the locking ring 6 abuts the stop surface 12 of the gear shift shaft 1 (see FIG. 4d).

The outer shift gate 44 is thereby unblocked because the axial height X of the locking teeth 9 corresponds exactly to the axial displacement of the gear shift shaft 1 between the outer shift gate 44 and the next inner shift gate 43.

If the respective gear G6 is disengaged again by a return rotation 19 of the gear shift shaft 1 into the neutral position of the shift gate 43, with a rotary entrainment of the locking ring 6 and a buildup of torsional tension in the leg coil spring 15 (see FIG. 4e), then the gear shift shaft 1 can, with an increase of the axial tension of the leg coiled spring 15, be moved axially outward with further axial displacement 16, until the locking surface 10 of the locking ring 6 abuts the locking surface 11 of the bearing cover 4. The operating position shown in FIG. 4e corresponds to the selector position of the outer shift gate 44. Subsequently, by rotating the gear shift shaft 1, a gear G7, G8 of the outer shift gate 44 can be engaged.

After leaving the outer shift gate 44, any shift gate 41, 42, 43 can be selected. Upon reaching the center shift gate 42, the engagement of the locking teeth 9 of the locking ring 6 in the recesses 14 of the gear shift shaft 1 is released, whereupon the locking ring 6 due to the peripheral return force of the leg coil spring 15, returns again into its rotational rest position.

By using the locking device according to the invention, a direct upshift from a gear G3, G4 of the center shift gate 42 to the outer shift gate 44, and thus, the associated sharp drop in tractive power, is reliably prevented in a purely mechanical manner. For unblocking the outer shift gate 44, initially a gear G5, G6 of the adjacent, the inner shift gate 43 next to the outer shift gate 44, must be engaged. A direct return shift from a gear G7, G8 of the outer shift gate 44 into a gear G3, G4 of a further inner lying shift gate 42, that is, skipping the next inner shift gate 43, is however not prevented by the locking device 5.

REFERENCE CHARACTERS 1 gear shift shaft
2 shift finger
3 guide shaft
4 bearing cover
5 selector interlock
6 locking ring
7 bearing sleeve
8 stop surface of locking ring 6
9 locking tooth
10 locking surface of locking ring 6
11 locking surface of bearing cover 4
12 stop surface of gear shift shaft 1
13 axial recess
14 axial recess
15 leg-coil spring
16 axial displacement of gear shift shaft 1
17 rotation of gear shift shaft 1
18 axial reset of locking ring 6
19 return rotation of gear shift shaft 1
20 shift pattern
21 first shift gate
22 second, center shift gate
23 third shaft gate
24 selector gate
25 manual shift lever
30 shift pattern
31 first shift gate
32 second, center shift gate
33 third shaft gate
34 fourth shift gate
35 selector gate
36 manual shift lever
40 shift pattern
41 first shift gate
42 second, center shift gate
43 third, next inner shift gate
44 fourth, outer shift gate
45 fifth shift gate
46 selector gate
47 manual shift lever
G1-G8 forward gears
R reverse gear
X axial height of locking tooth 9, (outer) shift gate distance

The invention claimed is:

1. A shifting device for a motor vehicle manual transmission that comprises at least two axis-parallel transmission shafts that can be selectively brought into drive connection with each other via a plurality of gear sets of different transmission ratios, the shifting device comprising:

a gear shift shaft (1) being disposed in a transmission housing in an axially displaceable manner for transmitting selection processes and being rotatable about a longitudinal axis for transmitting shifting processes, a selector interlock (5) being operationally form locking for preventing axial displacement of the gear shift shaft (1) into an outer shift gate (44), the selector interlock (5) comprising a locking ring (6) which is supported coaxial with the gear shift shaft (1) in an axially displaceable and rotatable manner, an axially inner stop surface (8) having at least one locking tooth (9) projecting axially by an outer shift gate distance (X), and an axially outside lying locking surface (10), which is held by a linear spring in an axial rest position in which an axial displacement (16) of the gear shift shaft (1), in a direction of the outer shift gate (44), leads to a stop surface (12) of the gear shift shaft (1) abutting the locking tooth (9) either prior to or upon reaching a second inner lying shift gate (42), and from the axial rest position, a further axial displacement (16) of the gear shift shaft (1) upon reaching a next inner shift gate (43) leads to the locking surface (10) of the locking ring (6) abutting a locking surface (11) fixed to the housing, and which is held by a torsion spring in a peripheral rest position in which a rotation (17) of the gear shift shaft (1) leads to axial engagement of the locking tooth (9) of the locking ring (6) into an axial recess (13, 14) in the stop surface (12) of the gear shift shaft (1) upon reaching a shift position of at least one of two gears (G5, G6) of the next inner shift gate (43).

2. The shifting device according to claim 1, wherein the locking ring (6) is supported such that the locking ring and the gear shift shaft (1) are axially displaceable in relation to each other.

3. The shifting device according to claim 1, wherein the gear shift shaft (1) is a hollow shaft supported on a guide shaft (3) that is fixed to the housing, and the locking ring (6) is supported on the guide shaft (3) such that the locking ring and the guide shaft are displaceable in relation to each other.

4. The shifting device according to claim 1, wherein the locking ring (6) is glidingly supported on a bearing sleeve (7) coaxial with the gear shift shaft (1) mounted at an axial end at a housing component (4).

5. The shifting device according to claim 1, wherein at least one axial recess (13, 14) is provided in the stop surface (12) of the gear shift shaft (1) for each shift position of the two gears (G5, G6) of the next inner shift gate (43).

6. The shifting device according to claim 1, wherein the locking ring (6), at the axial inner stop surface (8), comprises at least two axially projecting locking teeth (9) disposed diagonally opposite, and two axial recesses (13, 14) disposed diagonally opposite are provided in the stop surface (12) of the gear shift shaft (1) respectively in each unlocking shift position of the next inner shift gate (43).

7. The shifting device according to one of the claim 1, wherein the linear spring is a compression spring disposed between the locking ring (6) and a component (4) fixed to the housing.

8. The shifting device according to claim 7, wherein the compression spring is a coil spring that is disposed coaxial to the gear shift shaft (1), and outer windings of the compression spring respectively abut against an annular collar of the locking ring (6) and the component (4) fixed to the housing.

9. The shifting device according to claim 1, wherein the torsion spring is a leg spring that is disposed coaxial with the gear shift shaft (1), and legs of the linear spring are bent to form a helix, and the legs of the linear spring are inserted in an axial bore hole of the locking ring (6) and of the component (4) fixed to the housing respectively.

10. The shifting device according to claim 1, wherein the linear springs and the torsion springs are combined in a common spring element.

11. The shifting device according to claim 10, wherein the common spring element is a leg coil spring (15) that is disposed coaxial with the gear shift shaft (1), opposite end windings of the common spring element respectively abut against an annular collar of the locking ring (6) and the component (4) fixed to the housing, and the opposite end windings are axially bent to form axially extending legs of the common spring element which are respectively inserted in an axial bore hole of the locking ring (6) and an axial bore hole of the component (4) fixed to the housing.

12. The shifting device according to claim 10, wherein the common spring element is a leg coil spring (15) that is disposed coaxial with the gear shift shaft (1), opposite end windings of the common spring element respectively abut against an annular collar of the locking ring (6) and the component (4) fixed to the housing, and the opposite end windings are radially bent to form legs of the common spring element which abuts against a radial projection of the locking ring (6) and the component (4) fixed to the housing.

13. The shifting device according to claim 1, wherein the selector interlock (5) is disposed in a multi-stage manual transmission, having the outer shift gate (44) that is separated from the inner lying shaft gate by at least two shift gates and the outer shift gate is allocated to either a highest forward gear (G7) or next highest forward gears (G7, G8), and the selector interlock is provided as an upshift interlock.

14. The shifting device according to claim 1, wherein the selector interlock (5) is disposed in a multi-stage manual transmission, having the outer shift gate (45) that is separated from the inner lying shaft gate by at least two shift gates and the outer shift gate is allocated only to a reverse gear (R), and the selector interlock is provided as a reverse gear interlock.

15. A shifting device for shifting gear ratios in a motor vehicle manual transmission that comprises at least two axis-parallel transmission shafts that are connectable with each other, via a plurality of gear sets, according to a shift pattern having a selector gate and a plurality of shift gates, the shifting device preventing a direct upshift from a gear ratio in a center shift gate to a gear ratio in an outer shift gate, the shifting device comprising:

a guide shaft having an end fastened to a bearing cover which is fixed to a housing of the manual transmission, the guide shaft defining a longitudinal axis a hollow gear shift shaft which is disposed within the housing of the manual transmission and coaxially supported by the guide shaft, the gear shift shaft is axially displaceable on the guide shaft along the longitudinal axis for selecting a shift gate of the shift pattern of the manual transmission, and the gear shift shaft is rotatable on the guide shaft about the longitudinal axis for shifting between the gear ratios of the selected shift gate, an axial end of the gear shift shaft that faces the bearing cover has a stop surface with axially extending recesses;

a locking ring being coaxially supported on the guide shaft and axially arranged between the bearing cover and the gear shift shaft, the locking ring being axially and rotationally displaceable with respect to the guide shaft, the locking ring has an axial end with a locking surface that faces the bearing cover, an opposite end of the locking ring has an annular collar with a stop surface that faces the gear shift shaft, the stop surface of the locking ring has axially extending teeth;

a helical spring being coaxially aligned between the bearing cover and the locking ring, the helical spring having a first axial end fixed to the bearing cover and a second axial end fixed to the annular collar of the locking ring such that the locking ring is subjected to torsional force and axial force by the helical spring;

the teeth projecting axially from the stop surface of the locking collar by a distance equal to a distance between an inner shift gate and the outer shift gate, from an axially relaxed position of the helical spring, which corresponds to the center shift gate, the gear shift shaft is biased axially in a direction of the outer shift gate such that the stop surface of the gear shift shaft abuts the teeth of the locking ring either before or when the gear shift shaft is in a position corresponding to an intermediate shift gate which is located in the shift pattern between the center shift gate and the outer shift gate; and from the position of the gear shift shaft that corresponds to the intermediate shift gate, further axial displacement of the gear shift shaft leads to the locking surface of the locking ring abutting the bearing cover and rotation of the gear shift shaft from a radial rest position leads to axial engagement of the teeth into the recess in the stop surface of the gear shift shaft when the gear shift shaft is in a shift position in the intermediate gate which corresponds to one of the gear ratios of the intermediate gate.

* * * * *